M. FISCHBACH.
BELT TIGHTENER.
APPLICATION FILED MAR. 25, 1920.

1,374,643.

Patented Apr. 12, 1921.

WITNESSES

INVENTOR
Many Fischbach.
BY William Weiss
ATTORNEY

UNITED STATES PATENT OFFICE.

MANY FISCHBACH, OF NEW YORK, N. Y.

BELT-TIGHTENER.

1,374,643.    Specification of Letters Patent.    Patented Apr. 12, 1921.

Application filed March 25, 1920. Serial No. 368,736.

*To all whom it may concern:*

Be it known that I, MANY FISCHBACH, a citizen of Poland, (having secured my first United States citizenship papers,) and a resident of the city of New York, borough of the Bronx, in the county of Bronx and State of New York, have invented a new and useful Belt-Tightener, of which the following is a full, clear, and exact description.

This invention relates to belt tighteners and has for an object to provide an improved construction which is especially adapted for tightening belts of power-driven sewing machines, wherein a structure is presented which will maintain the belt at the proper tension without any tendency to stretch the belt too tightly.

Another object of the invention is to provide a belt tightener wherein a spring is utilized to produce a continuous tightening effect and adjusting means are utilized for adjusting the spring and associate parts to take up appreciable slackness in the belt, and which tightener acts automatically while the machines are in operation, saving time and material, and increasing production, with safety to the worker.

A still further object of the invention is to produce a tightener having a large range of adjustment, and one which may be used as a stationary take up for the belt or as an automatic resilient take up providing a constant resilient strain on the belt.

Figure 4:
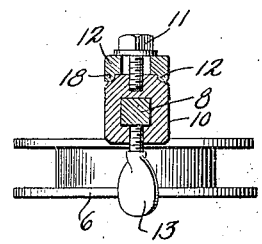
Fig. 4 is a horizontal sectional view through Fig. 2 on line 4—4.

Referring to the accompanying drawing by numerals, 1 indicates a sewing machine of any desired type having a platform 2, and supplied with a belt 3 driven from a pulley 4 receiving power from a shaft 5. The belt 3 may be of any desired material, but is usually made from leather. As is well known, belts of this kind, or in fact any kind, will stretch more or less and the result will be slipping of the belt which necessitates taking up the slack in some manner, as for instance by cutting the belt and drawing the parts together, or providing a tightener of some type. In the present invention a tightener is provided which is formed with a grooved pulley 6, though some other type of pulley could be used, said pulley being mounted on a journal pin 7, which is held in place on the bar 8 in any desired manner, as for instance by a nut 9. The bar 8 is preferably constructed square in cross section as shown in Fig. 4, and slidingly fits into a square aperture in the adjusting block 10, which has a threaded socket for receiving the clamping screw, 11, said clamping screw passing through a supporting standard 12 hereinafter fully described. A set screw 13 is also mounted in the block 10 and is adapted to press against bar 8 whenever desired for locking the same against independent movement, and when this is done the pulley 6 is, of course, locked in a stationary position.

Figure 1:
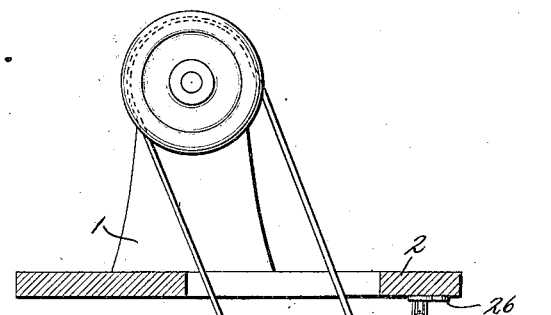
Figure 1 is a fragmentary view of a sewing machine with a belt tightener embodying the invention shown in connection therewith.
Figure 2:
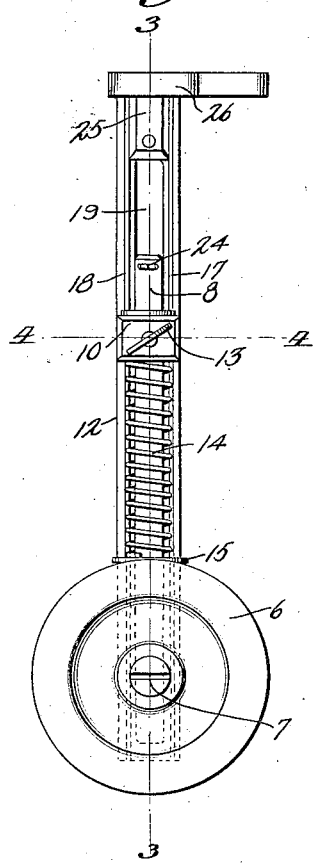
Fig. 2 is a side view of the belt tightener shown in Fig. 1.
Figure 3:
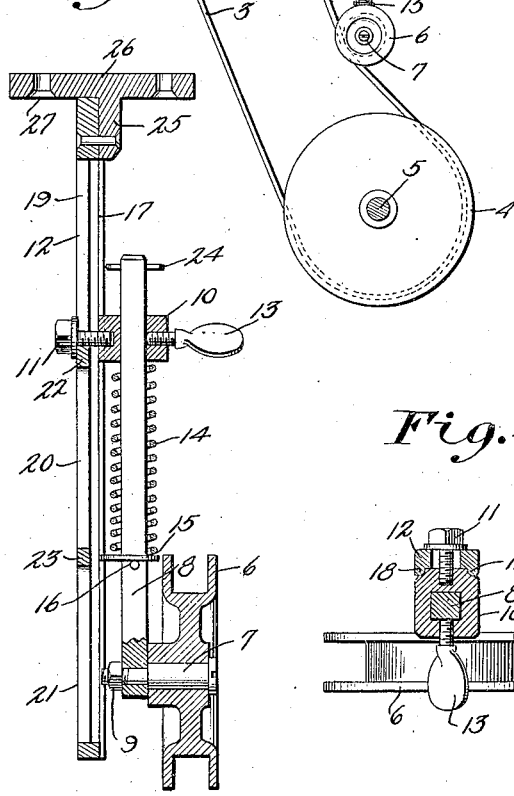
Fig. 3 is a sectional view through Fig. 2 on line 3—3.

In many instances it is desirable to provide a continuous slight pressure against the belt 3, and when this is the case set screw 13 is loosened and the spring 14 surrounding the bar 8 is permitted to act for giving the pulley 6 a tendency to continually press against the belt 3. Spring 14 presses against a suitable washer 15 held in place in any desired manner, as for instance by a pin 16, while the opposite end of the spring acts against the block 10 whereby the bar 8, pulley 6 and associate parts are urged away from the block 10 and against the belt 3 when the device is in operation. The block 10 presses against the tracks or recesses 17 and 18, as indicated particularly in Fig. 4, where it is clamped in place by the clamping screw 11. The supporting standard 12 is not only provided with these runways for block 10, but is provided with grooves 19, 20 and 21, said grooves being separated by bracing sections 22 and 23 integral with the remaining part of the standard. This arrangement of standard and slots permits the clamping screw 11 to be placed substantially at any point from near the upper to near the lower end of the standard. For instance, in Fig. 3 the screw 11 has been adjusted to its lowermost position in slot 19, but in case it should be desired to move the block 10 farther down the screw could be removed and passed through the slot 20 and spring 14 and associate parts would continue to operate as before. In some instances it may not be desirable to utilize the spring 14, in which instance said spring could be taken off and dispensed with completely, or could be left in place and the bar 8 locked in any desired adjusted position relative to block 10 by the set screw 11. A stop of any kind, as for instance a cotter pin 24 is provided for the upper end of bar 8 so as to prevent any accidental removal thereof. The supporting standard 12 may be connected to a support in any desired manner. In the drawing it is shown as secured to the depending flange 25 of plate 26 by a rivet, though some other securing means could be provided. The plate 26 is provided with a plurality of screw receiving openings 27, said openings being arranged in a triangle in order to brace the support 12 in substantially all directions.

It will be, of course, understood that slight changes or modifications may be made without departing from the spirit of the invention, and that the device may be mounted beneath the platform, similar to platform 2, as shown in the drawing, or may be mounted in a horizontal position, or in fact in any desired position. The tightener has been designed especially to coact with the belts of sewing machines as illustrated in the drawing, but it may be used for tightening other belts used in other forms of machinery.

What I claim is:

1. A belt tightener comprising a slotted standard, a block adapted to engage said standard, a clamping bolt adapted to pass through any of said slots and engage said block for clamping the block to the standard, a sliding bar carried by said block, a pulley rotatably connected with said bar adjacent one end, and means for locking said bar in any adjusted position in respect to the block.

2. A belt tightener of the character described, a standard, a block adjustably carried by the standard, a bar slidably mounted in said block, a journal extending at right angles from said bar adjacent one end, a pulley rotatably mounted on said journal, a spring acting at one end on said bar for urging the same in one direction and acting on said block at the other end and a set screw for locking said bar to said block at any desired point, said set screw when operated acting to prevent said spring from acting.

3. A belt tightener of the class described comprising a standard provided with a block having a square opening therein, a rod square in cross section loosely mounted in said opening, the shape of the rod and opening being such that the rod cannot rotate but may freely reciprocate, a spring for resiliently holding said rod in a given position normally, a set screw for locking the rod in a rigid position, a journal member connected with said rod and extending at right angles thereto, and a pulley rotatably mounted on said journal.

4. A belt tightener comprising a standard having a plurality of slots therein arranged in axial alinement, said standard being also provided with a recess or runway on each side adjacent said slots, a block having an opening therein formed on one side with a surface conforming to the runways or recesses, a clamping screw adapted to extend through any of said slots and engage said block for clamping the same in said runways at any desired point along said slots, a bar arranged in the aperture in said block, and a rotatable pulley carried by said bar.

MANY FISCHBACH.